United States Patent [19]

van Bennekom et al.

[11] Patent Number: 4,705,933

[45] Date of Patent: Nov. 10, 1987

[54] METHOD FOR ATTACHING A DIAMOND COMPONENT TO METAL

[75] Inventors: Peter K. van Bennekom, Bergen; Michael Seal, Amsterdam, both of Netherlands

[73] Assignee: D. Drukker & Z.N. N.V., Amsterdam, Netherlands

[21] Appl. No.: 715,012

[22] Filed: Mar. 22, 1985

[30] Foreign Application Priority Data

Mar. 23, 1984 [NL] Netherlands ............... 8400939

[51] Int. Cl.⁴ ............................................. B23K 26/00
[52] U.S. Cl. ..................... 219/121 LC; 219/121 LD; 219/121 LM; 228/122; 125/30 R
[58] Field of Search ............... 219/121 LC, 121 LM, 219/121 LD, 121 LY; 228/122, 56.3, 263.13, 263.21; 76/101 R, DIG. 12, 101 A; 125/30 R

[56] References Cited

U.S. PATENT DOCUMENTS

| | | | |
|---|---|---|---|
| 3,210,171 | 10/1965 | MacDonald | 219/121 LD |
| 3,338,693 | 8/1967 | Letter | 219/121 LD |
| 3,586,813 | 6/1971 | Cruickshank et al. | 219/85 |
| 4,034,181 | 7/1979 | Packard | 219/121 LD |
| 4,172,219 | 10/1979 | Deml et al. | 219/121 LJ |
| 4,547,652 | 10/1985 | Raisig et al. | 219/121 LD |
| 4,560,853 | 12/1985 | Ziegel | 219/121 LD |

OTHER PUBLICATIONS

Dr. Michael Seal, "A Review of Methods of Bonding or Making Electrical Contacts to Diamond", Reprinted from Jun. 1969 Issue of *Engelhard Industries Technical Bulletin*.

*Primary Examiner*—M. H. Paschall
*Attorney, Agent, or Firm*—Lahive & Cockfield

[57] ABSTRACT

A method for attaching a diamond component to metal is described, wherein a layer of brazing material is provided at the interface between the diamond and the metal. A laser is used for heating the brazing material. The laser beam is focussed through the diamond at least substantially on the interface between the diamond and the metal. In one aspect, the invention is utilized in the manufacture of a travelling wave tube having a metal helix disposed within the tube. Diamond support blocks are bonded between the inner walls of the tube and the windings of the helix according to the method of this invention.

8 Claims, 6 Drawing Figures

METHOD FOR ATTACHING A DIAMOND COMPONENT TO METAL

BACKGROUND OF THE INVENTION

The invention relates to a method for attaching a diamond component to metal wherein a layer of brazing material is provided at the interface between the diamond and the metal.

According to a conventional method of this type the metal to which the diamond part has to be attached is heated to the brazing temperature of the brazing material, by resistance heating or electromagnetic heating, for example. In the first place problems occur in view of the different coefficients of expansion of the materials used. Further, deformation of the metal occurs easily. These problems are enhanced because the method is usually applied to vulnerable parts.

The invention aims to provide a method of the abovementioned kind, in which these disadvantages are obviated in a simple but nevertheless effective manner.

SUMMARY OF THE INVENTION

According to the invention a laser is used for heating the brazing material, wherein the laser beam is focussed through the diamond at least substantially on the interface between the diamond and the metal.

In this manner it is obtained that there is only a local heating at the location of the diamond-metal interface, so that hardly any deformation can occur. The problems with respect to the different coefficients of expansion do not occur to significant extent when the method according to the invention is used.

The method according to the invention may be used in different fields. It is for example possible to attach diamond parts to implements, such as tools and the like, in this manner. Another application field lies in the attachment of diamond windows in measuring equipment as for example in infrared spectographs.

A very useful application field of the method according to the invention lies in the manufacturing of a travelling wave tube with a metal helix accommodated in a tube. According to the invention support blocks consisting of diamond are brazed to the helix in a regular distribution along its circumference by focussing the laser beam through the support blocks at least substantially on the interface between the diamond and the metal.

The above-mentioned problems of the known method for attaching a diamond part to metal especially arise when brazing diamond support elements to the helix for a travelling wave tube. Such a helix is a rather vulnerable part, so that attaching diamond support elements in the usual manner is a very complicated operation. Further it is of the utmost importance that the pitch of the helix remains constant along the whole length, as a variation of this pitch will very adversely affect the amplification of the travelling wave tube. On application of the method according to the invention there is only a local heating so that significant deformation cannot occur.

According to a favourable embodiment of the method according to the invention the helix with the support blocks attached thereon is placed upon a mandrel, whereafter the mandrel is rotated and a laser beam is focussed tangentially on the periphery of the rotating helix with support blocks and moved along the axial length of the helix. Thereby the outer side of each support block is trimmed to the desired diameter by means of the laser beam so that any manufactoring tolerances in the support blocks and differences in the thickness of the layer of brazing material used are eliminated. Moreover a circular outer surface of the support blocks is obtained so that a good contact with the tube in which the helix is mounted, is guaranteed.

According to a favourable embodiment the helix with the support blocks attached thereon is shifted into the tube, whereafter the support blocks are brazed to the inner wall of the tube by heating the tube, wherein a brazing material is used, the brazing temperature of which is lower than the brazing temperature of the brazing material at the interface between the support blocks and the helix.

As an alternative of the invention apertures may be made in the tube in a regular distribution along its circumference with such an axial intermediate distance that the apertures coincide with the windings of the helix when the helix is in position in the tube. In this embodiment support blocks are located in the apertures and project into the tube, while the helix is shifted in the tube in such a manner that the windings of the helix come in positions opposite the support blocks, whereafter, for attaching each support block to the helix, the laser beam is focussed through the aperture and the diamond support block at least substantially at the interface of the diamond and the metal helix. The support blocks are brazed in the apertures of the tube by heating said tube, wherein a brazing material is used, the brazing temperature of which is lower than the brazing temperature of the brazing material at the interface between the support blocks and the helix.

The invention further relates to a travelling wave tube obtained by the method described, comprising a helix supported in a tube by diamond support blocks. According to the invention the support blocks are attached by brazed joints to the helix and the tube.

The invention will hereinafter be further explained by reference to the drawings in which some embodiments are shown.

DETAILED DESCRIPTION OF THE DRAWINGS

In the following description the method according to the invention is explained by reference to the manufacturing of a travelling wave tube. However this is only one of the many possible applications of the method according to the invention. The method can for example also be used for attaching diamond parts to implements, for attaching diamond windows in the casing of measuring equipment and the like. Further the method can be used for attaching a diamond tip on a metal shank for surgical instruments, pickup needles for audio and video discs and the like.

Figure 1:
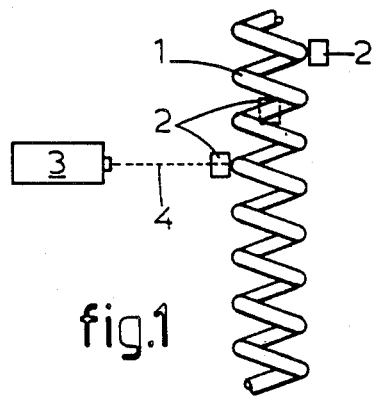
FIG. 1 shows a schematic view of a helix during the attachment of diamond support blocks.

Referring to FIG. 1 there is schematically shown a helix 1 for a travelling wave tube not further shown, during the attachment of diamond support blocks 2. The helix 1 may consist for example of copper coated tungsten or copper coated molybdenum. The attachment of the support blocks 2 to the helix is done by means of a brazing material located at the interface between the diamond and the metal and for example provided at the desired side of each support block 2 by sputtering.

For attaching the support blocks 2 a laser 3 is used. The laser beam 4 indicated by a dashed line is focussed through the diamond support block 2 to be attached to the metal, at least substantially at the interface between the diamond and the metal. Thereby a very intense but local heating of the brazing location is obtained, whereby no problems can occur due to different thermal coefficients of expansion so that the constant pitch of the helix 1 will not be adversely effected.

Subsequently the helix 1 with the support blocks, 2 brazed to it is placed on a mandrel 5 which can be rotated. At rotation of the mandrel 5 with the helix 1 located thereon, the support blocks 2 will describe a circular path. A laser 6 is installed in such a manner that the laser beam thereof is focussed tangentially on the smallest cylinder determined by the outer edges of the support blocks 2. Thereby each support block may be formed with a circular outer surface directed away from the helix 1, while any parts of the support blocks 2 projecting outside of said smallest cylinder will be cut by the laser beam. Thereby any manufacturing tolerances in the support blocks 2 and any varying thickness of the layer of brazing material will be corrected. Moreover, the cylindrical outer surfaces of the support blocks 2 provide a very good contact with the tube in which the helix 1 has to be mounted.

The helix 1 with the support blocks 2 attached to it is shifted subsequently in a tube as will be explained hereinafter for other embodiments. This tube may be made for example of molybdenum or copper. A layer of brazing material may be applied on the inner wall of the tube so that the support blocks 2 can be fixed on the inner wall of the tube by heating said tube. The brazing material applied on the inner wall of the tube has a melting point which is lower than the melting point of the brazing material at the interface between the support blocks 2 and the helix 1 so that the connections between the support blocks 2 and the helix 1 are not affected. For the brazing material between the support blocks and a molybdenum helix it is possible for example to use a gold-tantalum alloy having a brazing temperature of approximately 1200° C. The brazing material for the bond between the support blocks and the tube may consist of a titanium-copper-silver eutectic having a brazing temperature of approximately 930° C.

Figure 4:
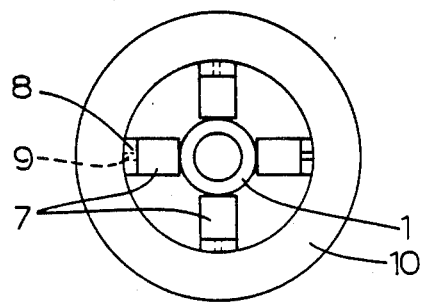
FIG. 4 is a section-view according to the line IV—IV in FIG. 3.
Figure 3:
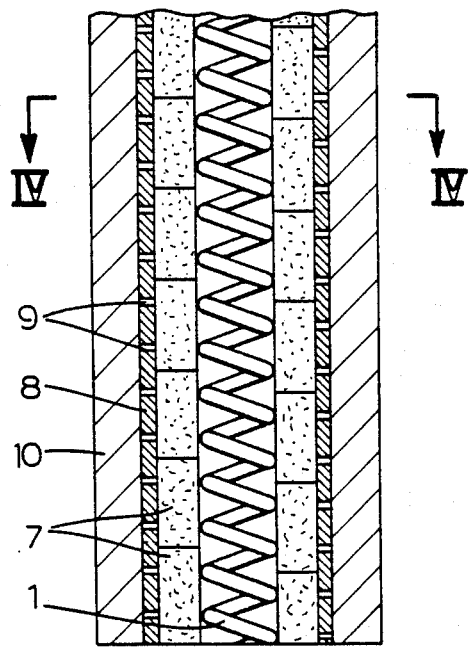
FIG. 3 is a schematic axial section of a helix mounted in a tube.
Figure 2:
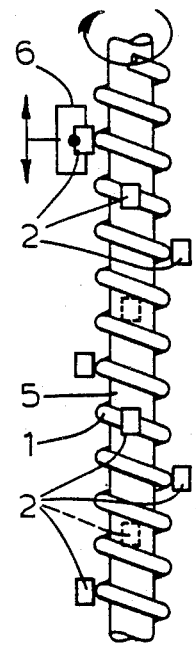
FIG. 2 is a schematic view of the helix of FIG. 1 with support blocks attached to it, wherein the helix is placed upon a mandrel.

FIGS. 3 and 4 show a part of a travelling wave tube made as follows. Support blocks 7 consisting of diamond are brazed on metal strips 8 while lying against each other. Apertures 9 are formed in each metal strip 8 with such an intermediate distance that the apertures 9 coincide with the windings of the helix 1 when the support blocks 7 are disposed on the helix 1. The metal strips 8 with the support blocks 7 are attached to the helix 1 regularly distributed along the circumference of the helix 1 by focussing the laser beam through the apertures 9 and the diamond support blocks 7 at least substantially at the interface of the diamond and the metal helix 1. Subsequently the helix 1 with the support blocks 7 with metal strips 8 may be fixed in a tube 10 by brazing in the above-described manner.

Figure 6:
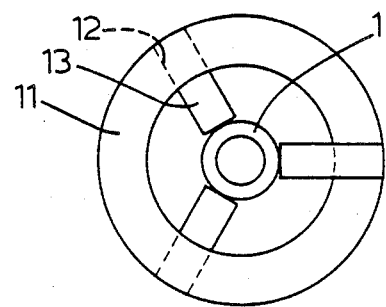
FIG. 6 is a schematic section-view according to the line VI—VI of FIG. 5.
Figure 5:
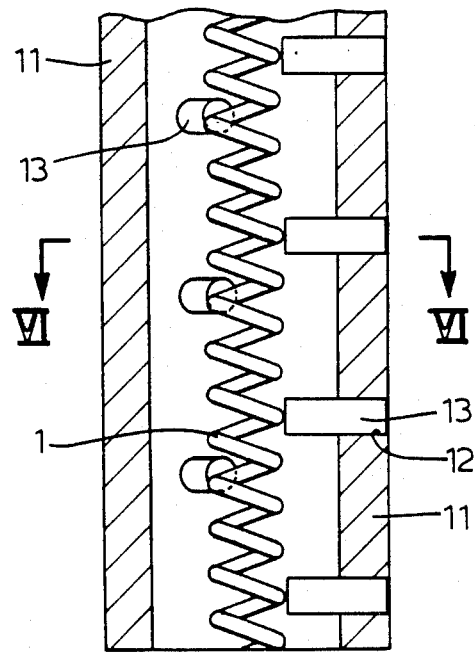
FIG. 5 is a schematic axial section of an other tube with a helix mounted in it.

FIGS. 5 and 6 show a part of a travelling wave tube made as follows.

In a tube 11 apertures 12 are provided regularly distributed along the circumference and with such an axial intermediate distance that the apertures 12 coincide with the windings of the helix 1 when the helix 1 is disposed in the tube 11. Support blocks 13 are located in the apertures 12 and project into the tube 11. The helix 1 is subsequently shifted into the tube 11 in such a manner that the windings of the helix 1 will become registered with the support blocks 13. For attaching each support block 13 to the helix, the laser beam can thereafter be focussed through the corresponding aperture 12 and the diamond support block 13 at the interface between the diamond and the metal helix 1. The walls of the apertures 12 can be coated with a brazing material, the brazing temperature of which is lower than the brazing temperature of the brazing material between the support blocks 13 and the helix 1.

In the above-described embodiments the support blocks 2, 13 are mounted with equal axial intermediate distances. However it is also possible to mount the support blocks in the output area of the helix 1 with a smaller intermediate distance than at the input area of the helix 1 in order to improve the heat dissipation in the output area of the helix 1.

Although the helix of the embodiment shown in the drawings is made of a wire with a round cross-section, the helix may also be made of a wire with other cross-section configurations such as a rectangular cross-section.

The invention is not restricted to the above-described embodiments which may be varied in a number of ways within the scope of the invention.

We claim:

1. A method for assembling a travelling wave tube having a metal helix disposed therein, comprising the steps of:
   (a) providing diamond support blocks for mounting to said helix in a regular distribution along its circumference;
   (b) providing a layer of first brazing material at the interface between the support blocks and the helix; and
   (c) brazing the support blocks to the helix by heating the first brazing material by focusing a laser beam through the support blocks at least substantially on the interface between the diamond and the helix.

2. A method according the claim 1 further comprising the steps of:
   (a) placing upon a mandrel the helix having the support blocks attached thereto;
   (b) rotating the mandrel;
   (c) tangentially focusing a laser beam substantially on the periphery of the support blocks attached to the helix; and
   (d) moving said laser beam along the axial length of the helix.

3. A method according to claim 1 further comprising the steps of:
   (a) brazing a plurality of axially-aligned support blocks in contact with one another to a plurality of metal strips;

(b) forming an aperture in each material strip such that the apertures are adjacent the windings of the helix when the support blocks are mounted upon the helix; and (c) brazing the support blocks to the helix by focusing a laser beam through the aperture and the support blocks at least substantially on the interface between the support blocks and the helix.

4. A method according to claim 1 wherein the helix has a input and an output zone, the support blocks being attached to the helix in closer proximity to one another in the output zone than in the input zone.

5. A method according to claim 1 further including the steps of:

(a) inserting the helix, with support blocks affixed thereto, into a cylindrical tube; and (b) brazing the support blocks to the inner wall of the tube by heating the tube to melt a second brazing material disposed between each support block and the inner wall, the second brazing material having a brazing temperature lower than the first brazing material.

6. A travelling wave tube comprising:

(a) a hollow, cylindrical tube having inner and outer walls;

(b) a metal helix disposed within the tube; and (c) a plurality of diamond support means disposed between windings of the helix and the inner walls of the tube, the support means being joined to the helix by brazed joints formed by focusing a laser beam through the support means to the interface of the support means and the helix to melt a brazing material disposed therebetween.

7. A traveling wave tube according to claim 6 further comprising a plurality of metal strips disposed between the inner wall of the tube and the support means, the metal strips having apertures which coincide with the windings of the helix.

8. A travelling tube according to claim 7 wherein the support blocks contact each other.

* * * * *